(12) United States Patent
Nagata et al.

(10) Patent No.: US 6,659,348 B2
(45) Date of Patent: Dec. 9, 2003

(54) MANUAL IC CARD READER AND MANUAL CARD READER

(75) Inventors: Shigeyuki Nagata, Nagano (JP); Kazunori Takahashi, Nagano (JP); Toshio Tatai, Nagano (JP); Nozomi Watanabe, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/768,887

(22) Filed: Jan. 23, 2001

(65) Prior Publication Data

US 2001/0017318 A1 Aug. 30, 2001

(30) Foreign Application Priority Data

Jan. 24, 2000 (JP) ........................ 2000-014344
Jan. 24, 2000 (JP) ........................ 2000-014353
Nov. 27, 2000 (JP) ........................ 2000-359911
Dec. 21, 2000 (JP) ........................ 2000-389075

(51) Int. Cl.[7] .................................. G06K 7/03
(52) U.S. Cl. .................. 235/451; 235/380; 235/475; 235/479
(58) Field of Search ................. 235/451, 380, 235/475, 479

(56) References Cited

U.S. PATENT DOCUMENTS

| | | | | |
|---|---|---|---|---|
| 4,742,213 A | * | 5/1988 | Conant | 235/436 |
| 4,864,114 A | * | 9/1989 | Eriane et al. | 209/569 |
| 4,871,905 A | * | 10/1989 | Mita et al. | 235/475 |
| 5,010,239 A | * | 4/1991 | Mita | 235/441 |
| 5,036,184 A | * | 7/1991 | Sasaki | 235/479 |
| 5,051,566 A | * | 9/1991 | Pernet | 235/441 |
| 5,362,951 A | * | 11/1994 | Kanazawa et al. | 235/449 |
| 6,149,064 A | * | 11/2000 | Yamaoka et al. | 235/479 |
| 6,182,899 B1 | * | 2/2001 | Muller et al. | 235/475 |
| 6,186,402 B1 | * | 2/2001 | Johnson | 235/482 |
| 6,234,391 B1 | * | 5/2001 | Reichardt et al. | 235/441 |
| 6,240,515 B1 | * | 5/2001 | Carnegie et al. | 713/182 |
| 6,250,552 B1 | * | 6/2001 | Hirasawa | 235/475 |

FOREIGN PATENT DOCUMENTS

| | | | |
|---|---|---|---|
| CH | 683 725 | 4/1994 | |
| FR | 2 577 334 A | 8/1986 | |
| JP | 62 276682 | 12/1987 | |
| JP | 409167210 | * 6/1997 | G06K/13/12 |
| WO | WO 95 29459 | 11/1995 | |

OTHER PUBLICATIONS

*English Abstract of FR 2 577 334 A.
*English Abstract of JP 62 276682.
*English Abstract of CH 683 725.
*English Abstract of WO 95 29459.

* cited by examiner

Primary Examiner—Michael G. Lee
Assistant Examiner—Seung H Lee
(74) Attorney, Agent, or Firm—Reed Smith LLP

(57) ABSTRACT

A manual IC card reader has a recess at a frame constructing a card insertion slot in the card insertion direction for inserting and removing a card. The card insertion slot is configured to project an IC contact block toward a card pathway as the IC contact block comes in and then let the card be removed after data communication rolling elements in a free rotational condition provided in a front vicinity of a card stop position in the card direction to reduce an insertion load on the IC card when the IC card projects the IC contacts block toward the card pathway.

5 Claims, 16 Drawing Sheets

MANUAL IC CARD READER AND MANUAL CARD READER

BACKGROUND OF THE INVENTION a) Field of the Invention

The present invention relates to a manual card reader and a manual IC card reader.

b) Description of the Related Art

More specifically, the present invention relates to a manual IC card reader which pushes down an IC contacts block with the insertion of an IC card, to project it toward a card pathway.

In some IC card readers, cards are inserted and removed by hand In IC card readers, an IC contacts spring needs to be contacted with a contact terminal pattern on an IC card that has been stopped at a predetermined position when performing a data communication with the card.

For this reason, in a conventional manual IC card reader as illustrated in FIGS. 15 and 16, an IC contacts block 501 is supported by links 502, 503 to project toward a card pathway 504, a stop 508 is formed at the IC contacts block 501, and the IC contacts block 501 is pushed down for contact as the IC card 505 is inserted. The IC contacts block 501 is pulled opposite to the card insertion direction by a spring 506. The inserted IC card 505 hits against the stop 508, and moves the IC contacts block 501 stretching the spring 506. Therefore, the IC contacts block 501 is gradually lowered as it is moved together with the IC card 505, and brings the IC contacts spring 507 into contact with the contact terminal pattern on the IC card 105. Since the IC card 505 is accurately positioned by hitting against the stop 508 of the IC contacts block 501, the IC contacts spring 507 of the IC contacts block 501 precisely contacts the corresponding contact terminal pattern on the IC card 505.

Note that a code, 510, indicates a magnetic head, and a code, 511, indicates a foreign matter discharge opening.

In some manual card readers, a card is inserted and removed by hand for data reading and recording. FIG. 21 illustrates this kind, a manual card reader 601, in which magnetic data on a card 602 can be read by a magnetic head 603 as the card is inserted/removed.

On the other hand, in a manual IC card reader 604 as illustrated in FIG. 22, contacts 606 on a contacts block 605 need to be resiliently contacted on the card 602 which has stopped at a predetermined position for data communication with the card 602. Therefore, such a manual IC card reader 604 may be equipped with a stop 607 that establishes contact with the incoming edge of the card 602 for positioning the card. The manual IC card reader 604 illustrated in FIG. 22, for example, uses the stop 607 provided at the contacts block 605 to position the card 602 at the predetermined location.

However, in the above mentioned manual IC card reader, the IC contacts block 501 is pushed down as the IC card 505 is inserted, and accordingly the friction between the IC card 505 and the card running surface 509 of the card pathway 504 is increased.

In other words, as the IC contacts block 501 is lowered, the IC contacts spring 507 gradually but strongly presses the IC card 505 down onto the card running surface 509. This gradually increases friction that in turn becomes an insertion load on the IC card 505.

Furthermore, as the IC contacts block 501 is lowered, the IC contacts springs 507 arranged in two rows strongly and simultaneously press the IC card 505 down onto the card running surface 509. This increases friction that in turn becomes an insertion load on the IC card 505. Therefore, the force necessary to bring the card in increases abruptly during the insertion, thus deteriorating the operability of the card insertion.

Also, a user may misunderstand a sudden increase of the insertion load during the card insertion as the completion of the card insertion. If the user mistakenly stops pushing in the IC card 505 during the insertion, not only can an excellent contact not be obtained between the contact terminal pattern on the IC card 505 and the IC contacts spring 507 on the IC contacts block 501, but also an operational error may be caused due to an unusual contact position of the IC contacts spring 507.

With such a manual IC card reader 604, however, even when the card 602 taken inside the device is invalid due to expiration, etc., the card can be neither discharged from the back nor collected inside the device, but only returned to the card insertion slot. For this reason, users of the IC card reader 104 need to take the invalid card, which is returned to the card insertion slot, to the customer service to renew the card.

Also, if a user forgets to remove the card 602 from the IC card reader 604, others may exploit the card 602 for misuse.

OBJECT AND SUMMARY OF THE INVENTION

Then, a primary object of the present invention is to provide an IC card reader that can prevent an abrupt increase of the card insertion load, which is normally caused by projecting the IC contacts block onto the card pathway.

Also, a further object of the present invention is to provide an IC card reader that can prevent an abrupt increase of the card insertion load, caused by pushing the IC contacts block onto the card pathway.

Yet another object of the present invention is to provide manual card reader and manual IC card reader in which invalid cards or the cards that could not be withdrawn by hand (the card left behind) can be collected internally.

DESCRIPTION OF THE PREFERRED EMBODIMENTS

Figure 1:
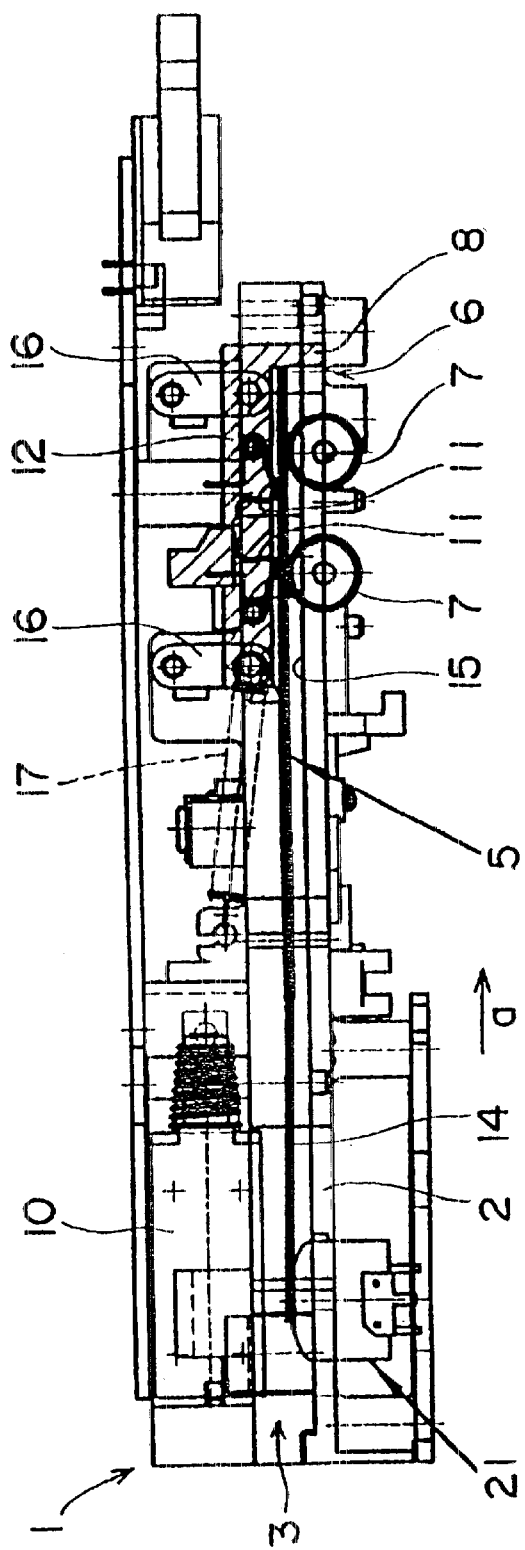
FIG. 1 is a side view of a manual IC card reader to which the present invention is applied, showing the condition which the IC card is inserted to the card stop position.

The configuration of the present invention will be described in detail hereinafter based on the embodiments illustrated in the figures.

FIGS. 1 through 4 illustrate an example of the embodiments of a manual IC card reader to which the present invention is applied. This manual IC card reader (hereinafter simply denoted as a card reader) 1 has a card inserting/removal recess 4 at a frame 2 constructing a card insertion slot 3 in the card insertion direction shown by an arrow, a. An IC card 5 is inserted at the card insertion slot 3 via the recess 4 to a card stop position 6 illustrated in FIG. 1; an IC contacts block 12 is projected toward a card pathway 14 as the IC card 5 comes in, and the IC card 5 is removed after data communication.

The recess 4 is a portion of the frame 2 indented in the card insertion direction so that the card 5 can be inserted/removed while held by hand. A guide portion 9 is formed on both sides of the recess 4 for guiding the card to be inserted. The shape of the recess 4 is not limited to the one shown in this embodiment, but can be of any shape as long as the insertion/removal of the card 5 is made possible or easy. Also, the card insertion slot 3 in this specification is a bottom surface (deeper side) of the recess 4 in the card pathway 14. The cross-sectional shape of the guide portion 9 is of a ]-shape so that, even if warped, the IC card 5 can be inserted with the warp being corrected.

The IC card 5 that is processed in the manual card reader 1 is an IC card having a magnetic strip. The card reader is capable of reading magnetic data on the magnetic strip as described later. Note that some IC cards 5 have no magnetic strip and the card reader 1 may be the one that processes such IC cards 5.

The card stop position 6 is in the deepest position of the card pathway 14. The incoming edge of the IC card 5 is stopped at the card stop position 6 so that an IC contacts spring 11 on the IC contacts block 12 makes contact with a contact terminal pattern (not illustrated) formed on the IC card 5.

The card reader 1 also has a magnetic head 21 as a card data reading means, in addition to the IC contacts block 12, for reading magnetic data in a magnetic strip. The magnetic head 21 may also function as a means to detect the insertion of the IC card 5 by detecting the magnetic data on the IC card 5.

The IC contacts block 12 is supported by four links 16, 16, for example. Therefore, the IC contacts block is lowered as it is moved to the back in the card transporting direction, and projected onto the card pathway 14 (FIG. 1). After the IC contacts block 12 is lowered, the IC contacts spring 11 resiliently contacts the contact terminal pattern on the IC card 5. On the other hand, when the IC card 5 is not inside the device (FIG. 2), the IC contacts block 12 is pulled in the card removal direction (the direction opposite the card insertion direction, a). Also, provided at the IC contacts block 12 is a stop 8 projecting toward the card pathway 14.

The card reader 1 comprises a rolling element 7 in a free rotational condition provided in the front vicinity of the card stop position 6 in the card insertion direction to reduce the insertion load on the IC card 5 when the IC contacts block 12 is contacted with the card pathway 14.

The rolling element 7 is, for example, a roller, positioned on the card running surface 15 that faces the IC contacts block 12 via the card pathway 14. The roller 7 can be made of rubber, plastic, etc.; the material of the roller is not specifically limited. However, the rolling element 7 is not limited to the roller, but may be a ball. Note that the roller is not a drive roller to which a drive force is transmitted from an actuator such as a motor, but a roller in a free rotational condition that rotates following the movement of the card. In the same manner, the ball is not a drive ball to which a drive force is transmitted from an actuator such as a motor, but a ball in a free rotational condition that rotates following the movement of the card.

The rolling element 7 is provided at four positions, which face the IC contacts block 12 excluding IC contacts springs 11 on the IC contacts block 12. In other words, the rolling element 7 is arranged at four positions outside the outmost IC contacts springs 11. Also, the four rolling elements 7 are evenly arranged with respect to the area formed by the contact terminal pattern on the IC card 5. The projecting amount of the rolling element 7 toward the card pathway 14 is designed considering the positional relationship with the IC contacts block 12. For example, the projecting amount is slightly smaller than that of the magnetic head 21 in the initial position (the position to which the magnetic head 21 is pushed toward the card pathway 14 by an elastic member (not illustrated)).

Also, the card reader 1 is provided a publicly-known lock lever (not illustrated) for preventing the inserted IC card 5 from coming off. As the IC card 5 is inserted up to the card stop position 6, the lock lever swung with the solenoid 10 is caught on the rear edge of the IC card 5 to prevent (lock) the IC card 5 from coming off. Thus, the forced removal of the card while the IC contacts spring 11 on the IC contacts block 12 is in contact with the contact terminal pattern on the IC card 5 is prevented.

The operation of the card reader 1 configured as above will be described.

When the IC card 5 is inserted at the card insertion slot 3, the magnetic data recorded on the magnetic strip on the IC card 5 is detected by the magnetic head 21. Accordingly the card reader 1 recognizes the insertion of the IC card 5. Also, the card insertion may be detected by a front sensor of a lever method, etc. The magnetic head 21 reads the magnetic data by using the operation of the insertion of the IC card 5.

When the incoming edge of the inserted IC card 5 hits against the stop 8 of the IC contacts block 12, the IC card 5 pushes the IC contacts block 12 forward stretching the spring 17. As supported by four links 16, the IC contacts block 12 is gradually lowered while pushed forward by the IC card 5.

With the IC contacts block 12 lowered, the IC contacts springs 11 come into contact with the contact terminal pattern on the IC card 5. For this reason, the IC card 5 is pushed to the rolling element 7. However, because the rolling element 7 rotates following the movement of the IC card 5, a large resistance against the insertion of the IC card 5 will not be generated. In other words, even when the IC card 5 is pushed to the rolling element 7 by the IC contacts springs 11, the load on the insertion force of the IC card 5 can be prevented from being generated. Consequently, the force necessary for the IC card 5 insertion can be prevented from increasing abruptly during the insertion.

After the IC card 5 is inserted up to the card stop position 6, the IC contacts block 12 is lowered to the position as shown in FIG. 1 so that the contact between the IC contacts springs 11 and the contact terminal pattern is made more secure. Also, the solenoid 10 is actuated to lock the IC card 5 with the lock lever. Then, the data communication is made between the IC contacts springs 11 and contact terminal pattern. Upon the completion of the data communication, the solenoid 10 is turned off to unlock the lock lever from the IC card 5. After this operation, the user can remove the IC card 5.

Figure 2:
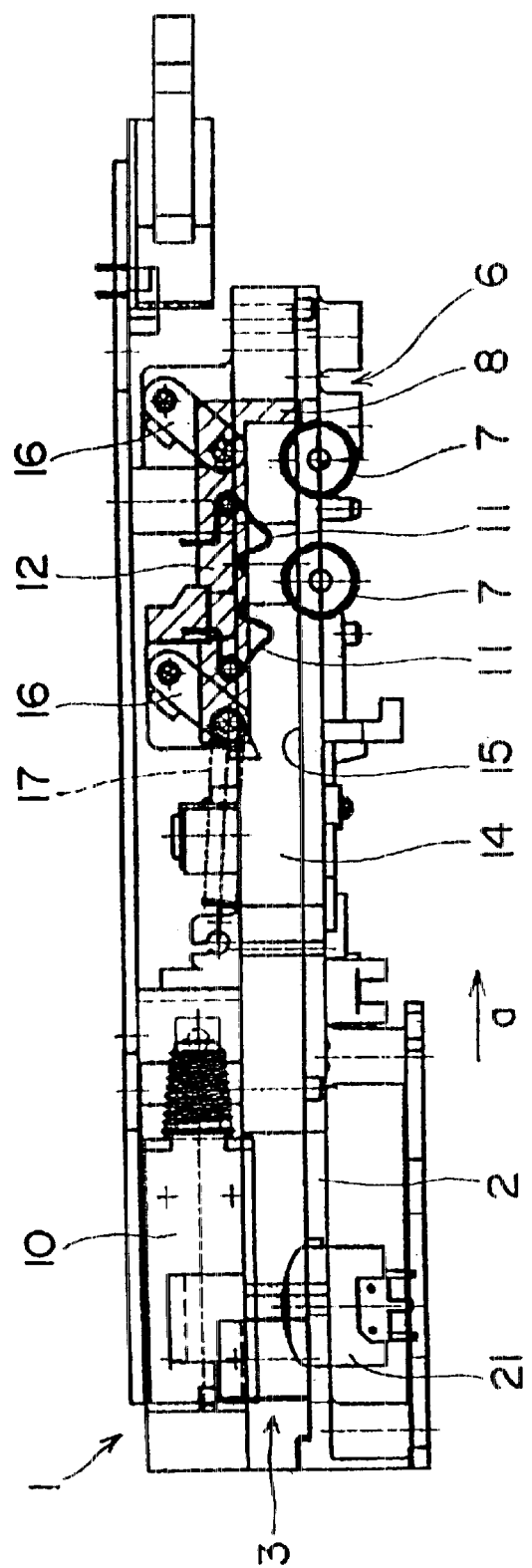
FIG. 2 is a side view of the manual IC card reader, showing the condition which the IC card is not inserted.
Figure 3:
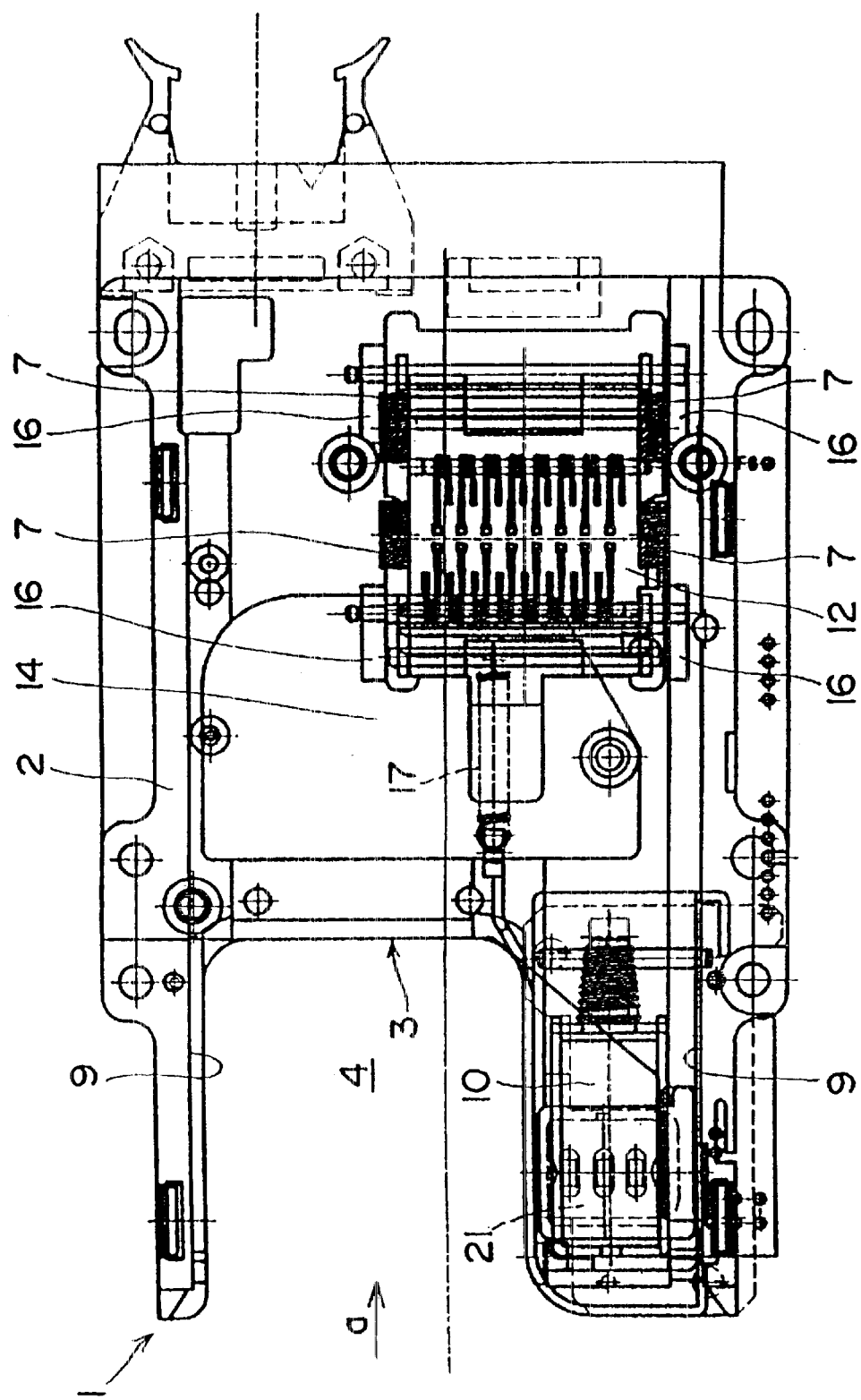
FIG. 3 is a plan view of the manual IC card reader.
Figure 4:
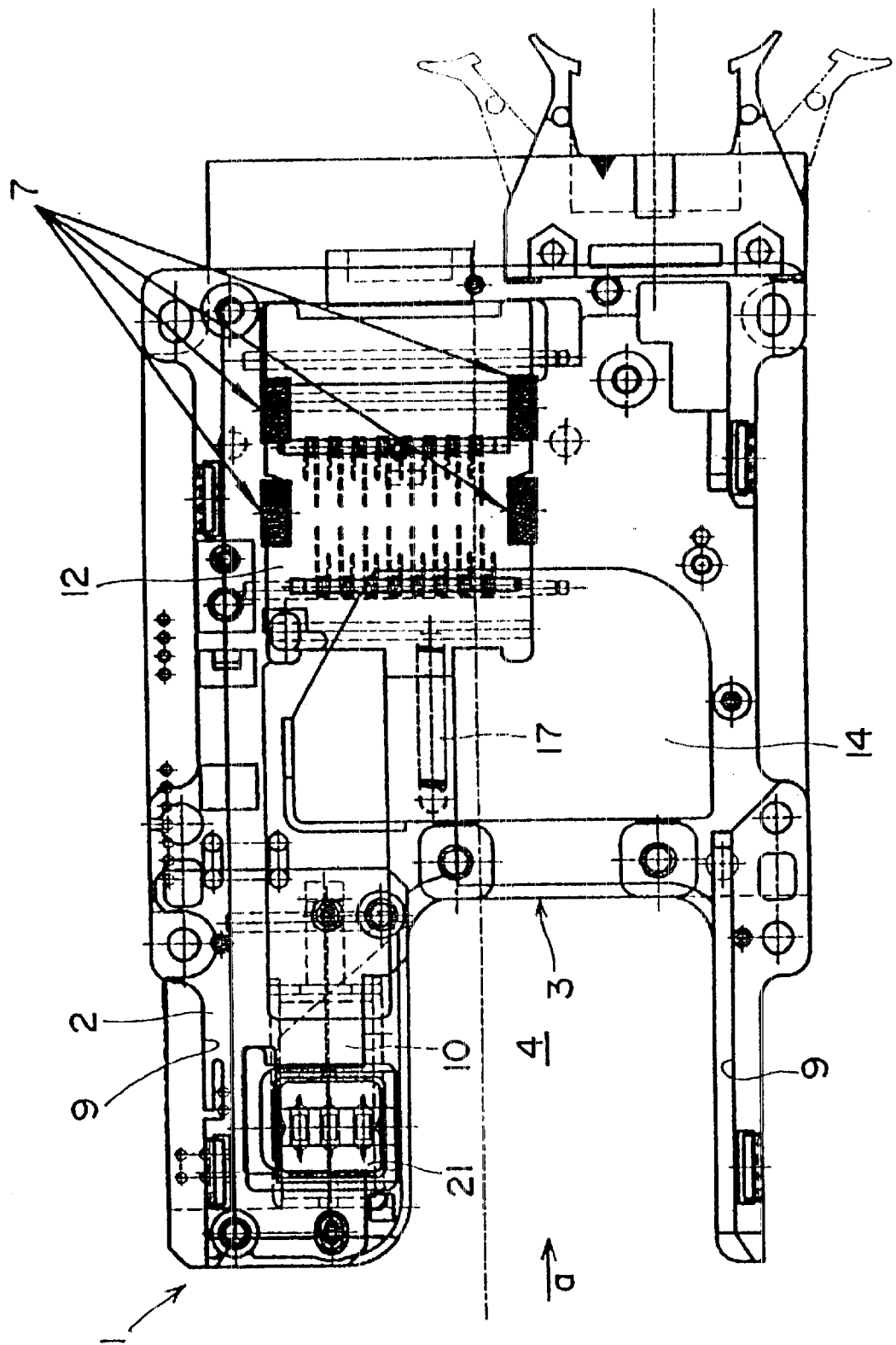
FIG. 4 is a bottom view of the manual IC card reader.

As the IC card 5 is pulled out by the user, the IC contacts block 12 is pulled back to the position as shown in FIG. 2 by the spring 17 to recede from the card pathway 14.

In this card reader 1, as described above, the force necessary for the insertion of the IC card 5 is prevented from increasing abruptly during the insertion; therefore, the operability of the card insertion is improved. In other words, in the manual IC card reader 1, the IC contacts block 12 is projected to the card pathway 14 by the inserted IC card 5, and the insertion load on the IC card 5 when the IC card 5 projects the IC contacts block 12 toward the card pathway 14 can be reduced. Therefore, a great change in the force necessary for the card insertion is prevented, thus improving the operability of the card insertion.

Since a great change in the force necessary for the card insertion can be prevented, it can be prevented that the user misunderstands the position of the card in the middle of the card insertion as the completed card insertion. For this reason, the IC card 5 can completely be inserted up to the card stop position 6, and the IC contacts springs 11 and contact terminal pattern can be accurately matched for secure contact.

On the other hand, when the IC card 5 is not inserted into the card reader 1, the input of disturbance such as vibrations may vibrate and consequently lower the IC contacts block 12. However, the rolling elements 7 are positioned to face the IC contacts block 12 excluding the IC contacts springs 11. Therefore, the IC contacts springs 11 do not directly contact the rolling element 7. Also the rolling elements 7 contact the lowered IC contacts block 12 and catch it; therefore, the IC contacts springs 11 do not hit the frame 2. Thus, the rolling elements 7 protect the IC contacts springs 11.

Note that the above embodiment is an example of the preferred embodiments of the present invention, but it is not limited to this and can be variously modified within the scope of the present invention.

Figure 5:
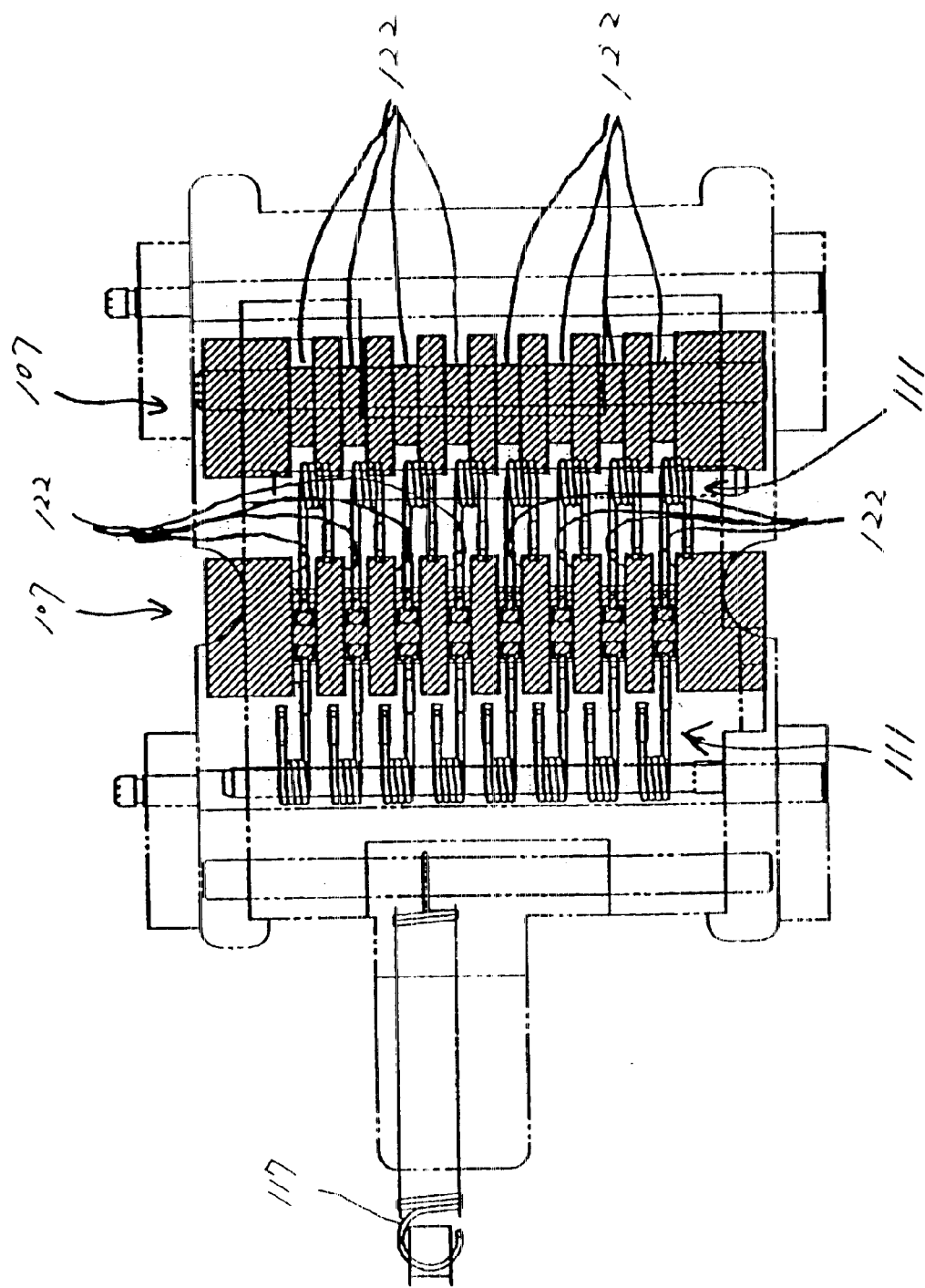
FIG. 5 is a plan view of a major portion of a manual IC card reader in another embodiment.
Figure 6:
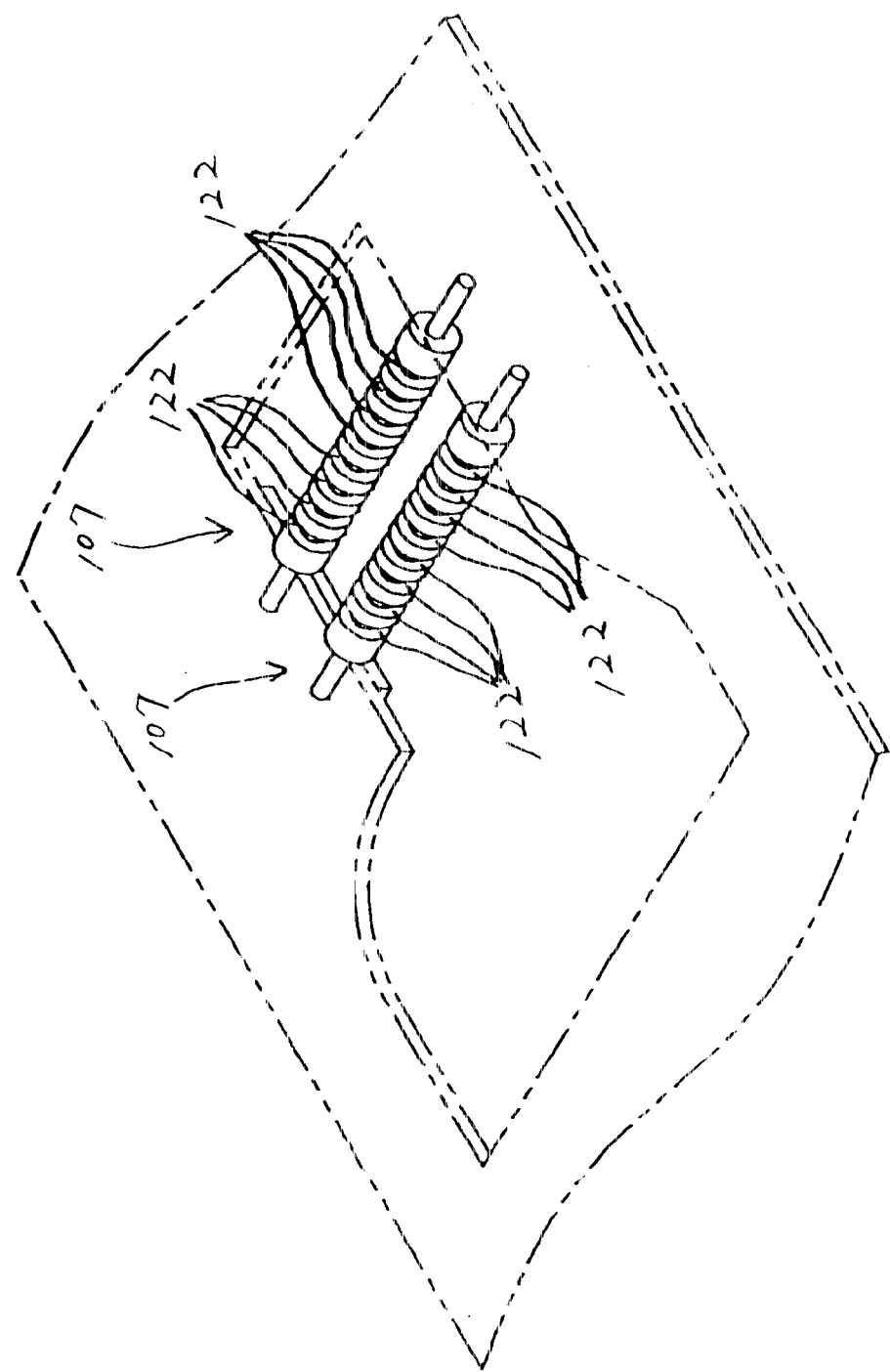
FIG. 6 is a perspective view of an rolling element.

For example, in this embodiment, the rolling element 7 is arranged at four positions outside the outmost IC contacts springs 11; however, it is not limited to this, as shown FIGS. 5 and 6, the front and rear rolling elements 107, 107 may be the rollers which are arranged over the entire width of the IC contacts block 12, and each of which has a groove formed on the locations thereon facing the IC contacts springs 111. In this case, since each of the rolling elements 107 is provided over the entire width of the IC contacts block 12, the IC card 5 can be supported over the entire width of the IC contacts block 12. Accordingly, the flatness of the portion of the IC card 5 that contacts the IC contacts springs 111 can be improved; therefore, the bad influence on the data communication, which is caused by the uneven contact pressure on the IC card 5 due to the warp of the IC card 5, can be prevented.

Although the rolling elements are arranged over the entire width of the IC contacts block 12 in the above embodiment, they may be arranged in the range shorter than the entire width of the IC contacts block 12. Even with this, the flatness of the IC card 5 in the area facing the rolling element 107 can be improved; therefore, the warp is prevented from occurring on the IC card 5. Thus, the length of the rolling element 107 can be determined according to the demand on the flatness of the IC card 5 which the rolling element 107 faces.

Furthermore, although, in the above mentioned embodiment, each of the front and rear rolling elements 107,107 has the groove 122, it is not limited to this. The groove 122 may be provided only on the rolling element 107 that faces IC contacts springs 111, but may not be provided on the other rolling element 107. Thus, the groove 122 is provided at least on the rolling element 107 that faces the IC contacts springs 111 to prevent the IC contacts springs from directly contacting the rolling elements.

As described above, in one form of the manual IC card reader, the rolling element in a free rotational condition is provided in the front vicinity of the card stop position in the card insertion direction to reduce the IC card insertion load obtained when the card projects the IC contacts block toward the card pathway. Therefore, friction caused when the IC card is pushed to the card running surface by the IC contacts spring can be reduced. In other words, while the IC card is slid directly against the card running surface in a conventional card reader, the rolling element is provided in this manual IC card reader to let the IC card slide with respect to the rolling element. Therefore, the generated friction here is a different kind. Beside, while the IC card makes a plane contact with the pathway in the conventional card reader, it makes a linear contact or point contact with the rolling element in the card reader of the present invention; thus, the contact surface is also different. Therefore, the friction can be greatly reduced. As a result, an abrupt increase in the card insertion load during the insertion of the IC card can be prevented, thus improving the operability of the card insertion. Also, it can be prevented that the user misunderstands the position of the card in the middle of the card insertion as the completed insertion position; therefore, the card can be processed with reliability, preventing operational error.

In a further arrangement of the manual IC card reader, the rolling elements are arranged to face the IC contacts block excluding the IC contacts springs on the IC contacts block; therefore, the IC contacts springs on the IC contacts block can be protected by the rolling element.

In a still further arrangement of the manual IC card reader, the rolling element is a roller or ball; therefore, a rolling element of a simple configuration can be obtained. For this reason, the number of the components can be reduced, accordingly reducing the manufacturing cost and minimizing the device.

In yet a further arrangement of the manual IC card reader, since the rolling elements are provided over the entire width of the IC contacts block, the IC card can be supported over the entire width of the IC contacts block. Accordingly, the flatness of the portion of the IC card that contacts the IC contacts springs can be improved; therefore, the bad influence on the data communication, which is caused by the uneven contact pressure on the IC card due to the warp of the IC card, can be prevented.

Moreover, since the rolling element has the groove formed in the location facing the IC contacts springs, when the IC contacts block is projected toward the card pathway without inserting the IC card, the IC contacts springs do not contact the rolling elements directly. In addition, the rolling elements contact the IC contacts block excluding the area of the IC contacts springs to prevent the IC contacts springs from contacting the card pathway. Therefore, the rolling elements protect the IC contacts springs from being damaged.

FIG. 7 through FIG. 13 illustrate another embodiment of an IC card reader of the present invention. This IC card reader comprises an attaching/detaching mechanism 233 that moves an IC contacts block 201 into contact with or away from a contact terminal pattern on an IC card 202. The attaching/detaching mechanism 233 brings a front contacts 208a and a rear contacts 208b on the IC contacts block 201 arranged in the card insertion direction shown by arrow, C, in the figure (hereinafter, denoted as the card insertion direction C) into contact with the contact terminal pattern on the IC card 202 such that a time lag is caused in contact starting time thereof with the IC card 202 (in this specification, simply called as "card contact starting time").

The IC card reader in this embodiment is a manual card reader, in which the IC contacts block is pushed down upon the insertion of the IC card 202 to contact the contact terminal pattern on the IC card 202 so that a data communication is made with the IC card 202.

The attaching/detaching mechanism 233 in this embodiment is, for example, a link mechanism (hereinafter, the attaching/detaching mechanism is called as the link mechanism 233). By changing the lengths of a rear link 217a and a front link 217b arranged in the card insertion direction, C, a time lag is caused in the card contact starting time between the contacts 208a and the contacts 208b.

Figure 7:
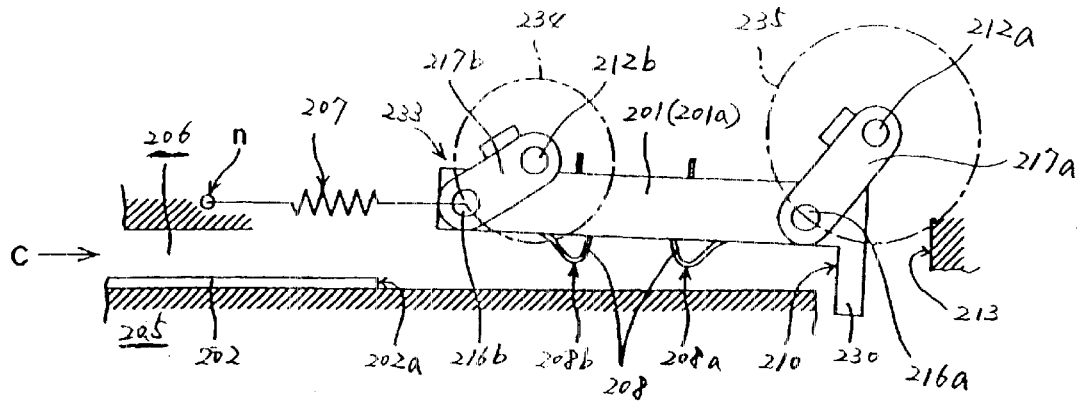
FIG. 7 illustrates a side view of an IC card reader of the present invention in one form of an embodiment, showing that an IC contacts block is in a standby position.

The IC contacts block 201 is mounted onto an IC card reader (not illustrated) via the links 217a and 217b. Each of the links 217a and 217b has holes at both ends, which are rotatably fitted to supporting shafts 212a, 212b, 216a, 216b respectively. Note that the IC contacts block in this embodiment is supported by four links 217a, 217a, 217b, 217b that make pairs facing in the perpendicular direction to the plane as shown in FIG. 7. In other words, the link mechanism 233 consists of four links 217a, 217a, 217b, and 217b so that the IC contacts block 201 is capable of contacting/separating with respect to the contact terminal pattern on the IC card 202.

In this embodiment, the rear link 217a in the card insertion direction C is longer than the front link 217b in the card insertion C. The supporting shafts 212a and 212b are provided such that the IC contacts block 201 comes in parallel to the IC card 202 when the links 217a and 217b are in perpendicular, i.e., when the IC contacts block 201 is at closest to the IC card 202. For example, the supporting shaft 212b is provided lower than the supporting shaft 212a in FIG. 7 so that the supporting shafts 216a and 216b are positioned at equal distances from the bottom surface of the card pathway 206 when the links 217a and 217b are in perpendicular. Note that a circle 234 shown by a dash-dot line in FIG. 7 is a trace of the link 217b rotated about the supporting shaft 212b. Also, a circle 235 shown by a dash-dot line in FIG. 7 is a trace of the link 217a rotated about the supporting shaft 212a.

Figure 10:
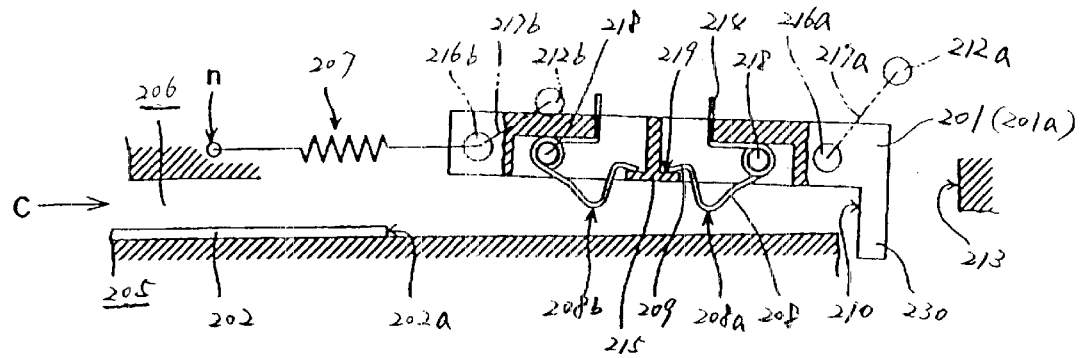
FIG. 10 is a cross-sectional side view of FIG. 7, showing the position of the contacts of the IC contacts block.
Figure 11:
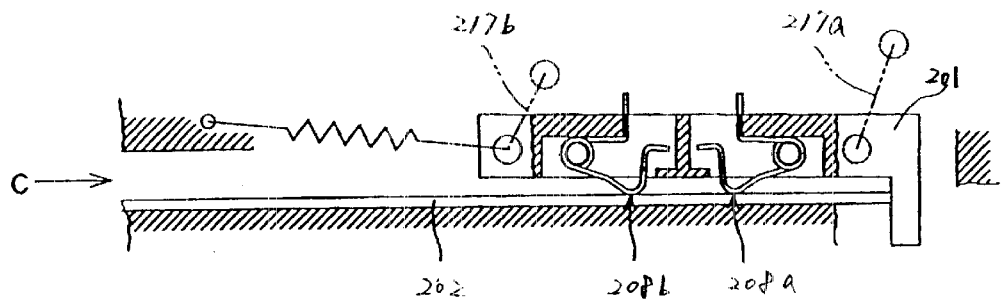
FIG. 11 is a cross-sectional side view of FIG. 8, showing the position of the contacts of the IC contacts block.

A forcing means, for example, a coil spring 207, is bridged from the supporting shaft 216b to a fixed point, n, in the IC card reader to lift the IC contacts block 201 in the upper left direction in the figure as illustrated in FIGS. 7 and 10, pulling the IC contacts block 201 away from a bottom frame 205. Consequently, a force against the gravity (the perpendicular force) of the IC contacts block 201 is generated, and the IC contacts block 201 is positioned away from the card pathway 206 (in this embodiment, this position is hereinafter called a standby position 201a). At this time, the IC contacts block 201 is on standby with a position slightly inclined in the upper left direction in FIG. 7 due to the different lengths of the links 217a and 217b.

The right end of the IC contacts block 201 in FIG. 7 is formed as a projecting portion 230; the end surface of the projecting portion 230 close to the card insertion slot is a card contact surface 210 that contacts the card incoming edge 202a. Also, on the side of another end surface of the projecting portion 230 opposite the card contact surface 210, a stopper 213 fixed at a fixed point in the card reader (not illustrated) is provided for controlling the movement of the IC contacts block 201.

In this embodiment, the IC contacts block 201 illustrated in FIGS. 9, 12, and 13 contacts the stopper 213 in a position at which the supporting shaft 216a is positioned slightly further deeper in the card insertion direction, C, than the supporting shaft 212a (in this embodiment, this position is hereinafter called a stopper contact position 201c). As illustrated in FIG. 13, in the stopper contact position 201c, a positional discrepancy L is created between the perpendicular line from the supporting shaft 216a to the bottom frame 205 and that from the supporting shaft 212a to the bottom frame 205. With this configuration, if the IC contacts block 201 is returned toward the card insertion slot due to vibration or reaction caused when the IC contacts block 201 contacts the stopper 213 upon insertion of the IC card 202, the IC contacts block 201 moves back maintaining the card incoming edge 202a and card contact surface 210 contacted together, and stops at the position at which the links 217a and 217b are in perpendicular to the bottom frame 205, that is, the position at which the contacts 208a, 208b press the IC card 203 with the strongest contact pressure.

A contacts terminal 208 is provided on the surface of the IC contact block 201 facing the bottom frame 205. The contacts 208a, 208b are brought into contact with the contact terminal pattern on the IC card 202 when the IC card 202 is inserted at the card insertion slot through the card pathway 206. The contacts terminal 208 is composed of a conductive flat spring or linear spring; the contacts 208a and contacts 208b are respectively formed at a predetermined diagonal distance away from the supporting shafts 218, and pushed toward the IC card 202 in the bottom frame 205 direction pivoting on the supporting shaft 218 as a supporting point (fulcrum). A plurality of the contact terminals 208 are arranged in the supporting shafts 212a, 212b direction, and the contacts 208a and 208b are arranged symmetrical about the controlling member 215 or in the same direction. Also, one end of the contacts terminal 208 is a connecting portion 214, which is electrically connected to a predetermined circuit. In addition, the other end is a controlling portion 209 bent in L-shape, which contacts a flange surface 219 of a contact position controlling member 214 to control the lowest positions of the contacts 208a, 208b. Note that the contacts terminal 208 is to be positioned to nearly come into contact with the bottom frame 205 when the IC card 202 is not inserted and the IC contacts block 201 is in the stopper contact position 201c.

In the figure, when the force to push the contacts 208a, 208b upward is not exerted, the controlling portion 209 is lowered to contact the flange surface 219 of the contacts position controlling member 215, as illustrated in FIG. 10. This means that, when the push-up force is exerted on the contacts 208a, 208b in FIG. 10, the pressure at least equal to the repelling force (spring force/resilient force) of the contacts is applied to the card because the push-up force is created against the repelling force. In other words, as the IC card 202 is inserted into the card pathway 206, the contacts 208a, 208b are pushed up from the flange surface 219 of the contacts position controlling member 215 by the IC card 202, and a pressure equal to the repelling force of the contacts 208a, 208b is applied on the IC card 202 (See FIG. 10 through FIG. 12).

An example of the operation of the IC card reader having the above configuration will be described.

The IC contacts block 201 illustrated in FIG. 7 and FIG. 10 is in the standby position 201a. With this condition, the IC card 202 is inserted at the card insertion slot in the card insertion direction C. Then, the card incoming edge 202a hits the projecting portion 230 of the IC contacts block 201 in the standby position 201a; as the IC card 202 is pushed in by the force stronger than the spring force of the spring 207, the IC contacts block 201 is moved together with and approaching the IC card 202 by the link mechanism 233 until the stopper 213 stops the movement thereof.

Since the links 217a, 217b differ in length from each other, the IC contacts block 201 moves, not in parallel, but diagonal to the card insertion direction, C, to approach and make contact with the IC card 202. With this, a time lag is caused in the card contact starting time between the contacts 208a and the contacts 208b. In other words, the rear contacts 208a in the card insertion direction C makes contact with the corresponding contact terminal pattern on the IC card 202 first, and then the front contacts 208b in the card insertion direction C comes into contact with the corresponding contact terminal pattern on the IC card 202 (see FIG. 8 and FIG. 10).

As the IC card 202 moves, the contacts 208a, 208b are lifted up from the flange surface 219 of the contact position controlling member 215, and the pressure equal to the spring force is applied on the IC card 202 by the contacts 208a, 208b. At this time, the contacts 208a and the contacts 208b contact the contact terminal pattern on the IC card 202 not simultaneously, but in a delayed manner. Therefore, an abrupt increase of the card insertion load, normally caused by the contact between the IC contacts block 201 and the IC card 202, can be prevented.

Figure 8:
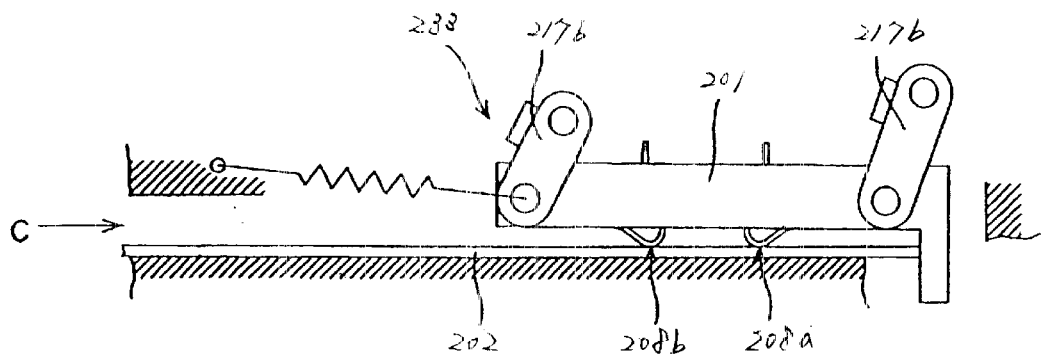
FIG. 8 is a side view of the IC card reader, showing that both rear and front contacts of the IC contacts block arranged in the card insertion direction are in contact with the IC card.
Figure 9:
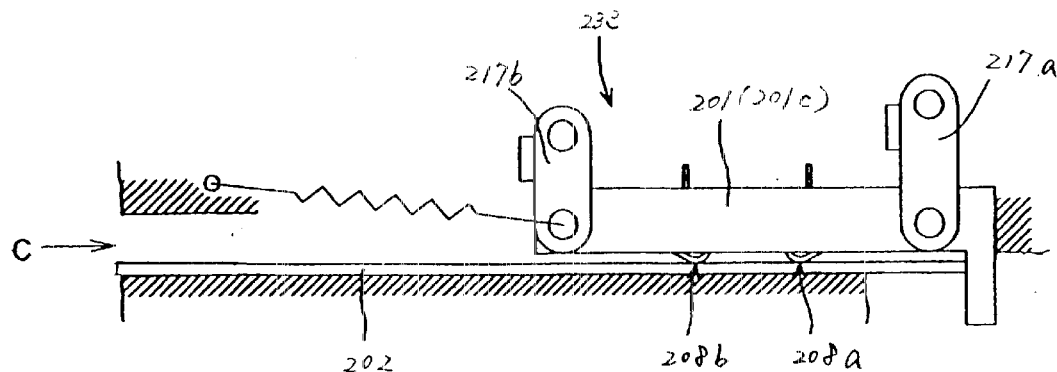
FIG. 9 is a side view of the IC card reader, showing that the IC contacts block is in contact with a stopper.
Figure 12:
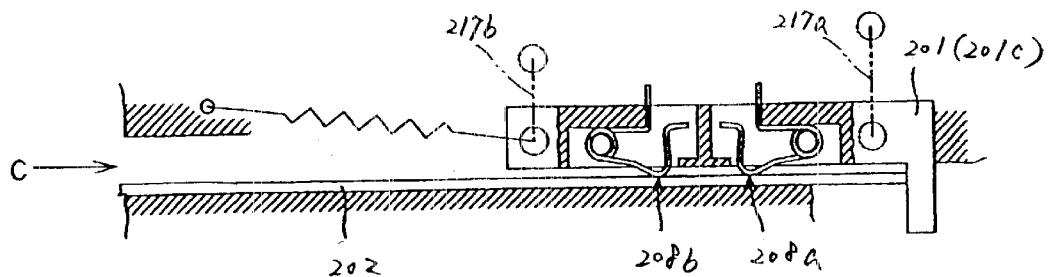
FIG. 12 is a cross-sectional side view of FIG. 9, showing the position of the contacts of the IC contacts block.
Figure 13:
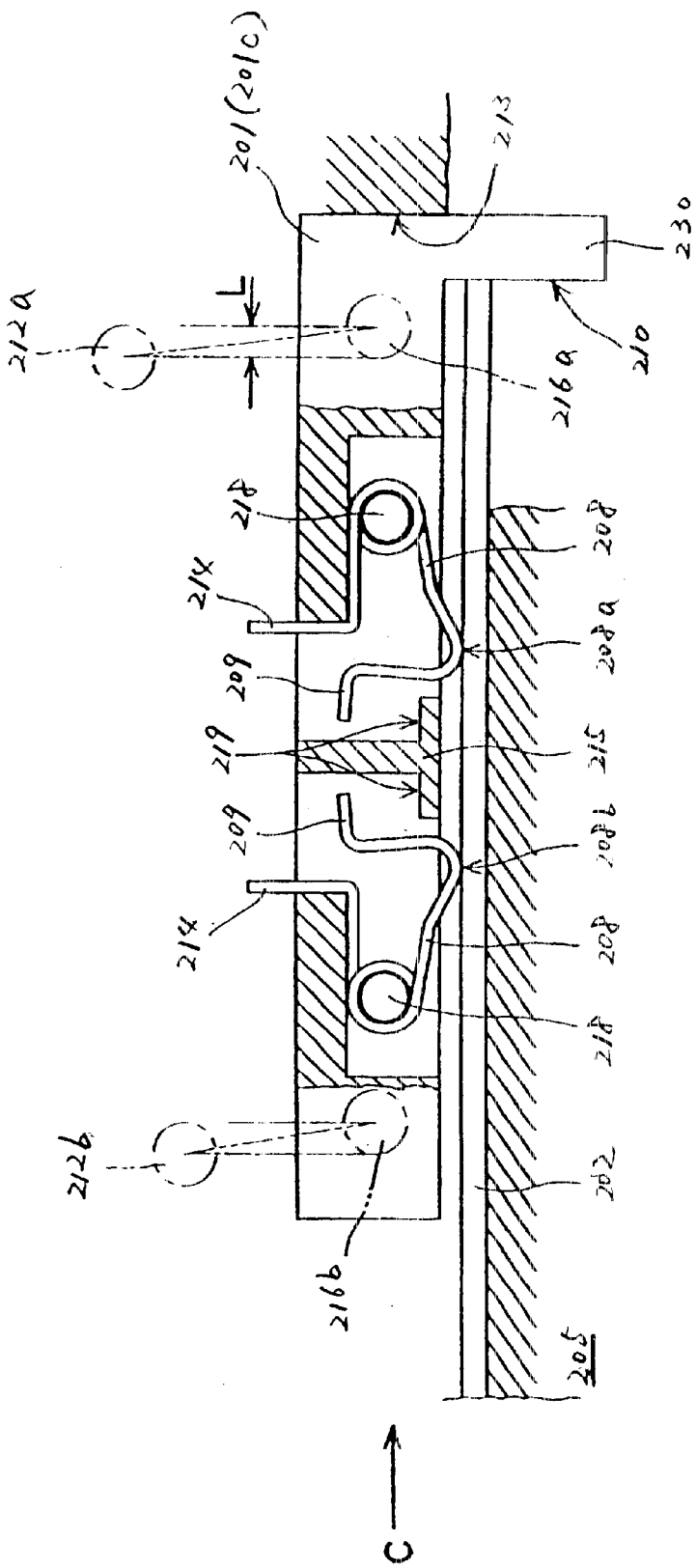
FIG. 13 is a magnified side cross-sectional view of FIG. 9, showing the position of the contacts of the IC contacts block.

After the condition illustrated in FIG. 8 and FIG. 10, in which both of the contacts 208a, 208b make contact with the IC card 202, the IC contacts block 201 soon contacts the stopper 213 and comes in the stopper contact position 201c illustrated in FIGS. 9, 12, and 13. At this time, the supporting shafts 216a, 216b are respectively at the position slightly (the distance, L, shown in FIG. 13, for example) passing the supporting shafts 212a, 212b in the card insertion direction C. With this, even though receiving the vibration or reaction caused when the IC contacts block 201 abuts the stopper, the IC contacts block 201 stops in the position at which the contact pressure of the contacts 208a and 208b on the IC card 202 is strongest, i.e., at which the links 217a, 217b are in perpendicular to the bottom frame 205, so that the contacts 208a, 208b are prevented from coming off the contact terminal pattern on the IC card 202.

Thus, maintaining an excellent contact condition between the contacts 208a, 208b and the contact terminal pattern on the IC card 202, the IC card reader communicates with the IC card 202 through the contacts 208a, 208b.

Figure 14:
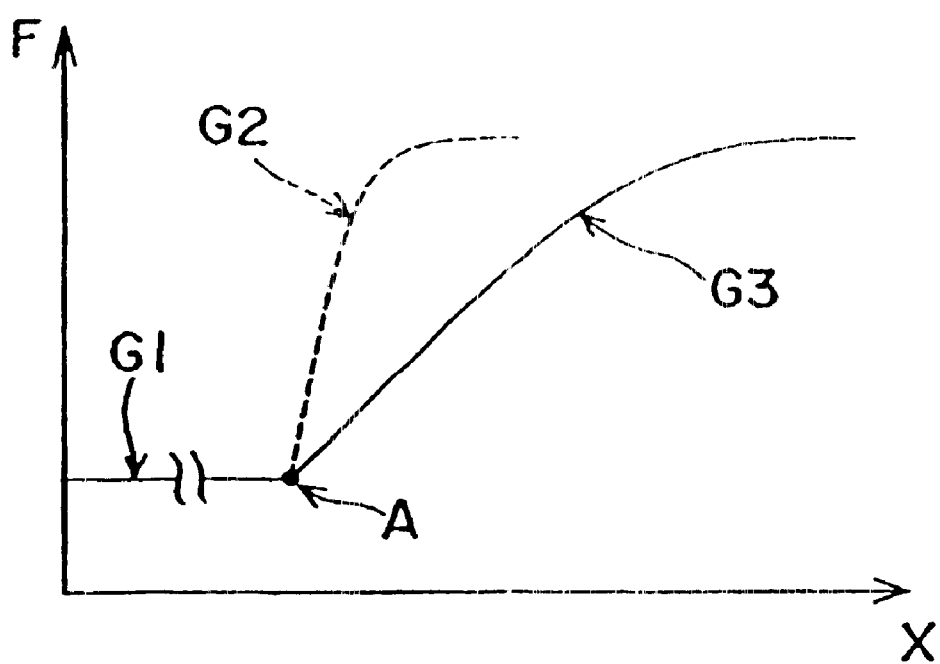
FIG. 14 is a graph showing an example of a relation between the moving distance of the IC card (horizontal axis) from the card insertion slot and the card insertion load (vertical axis)
Figure 15:
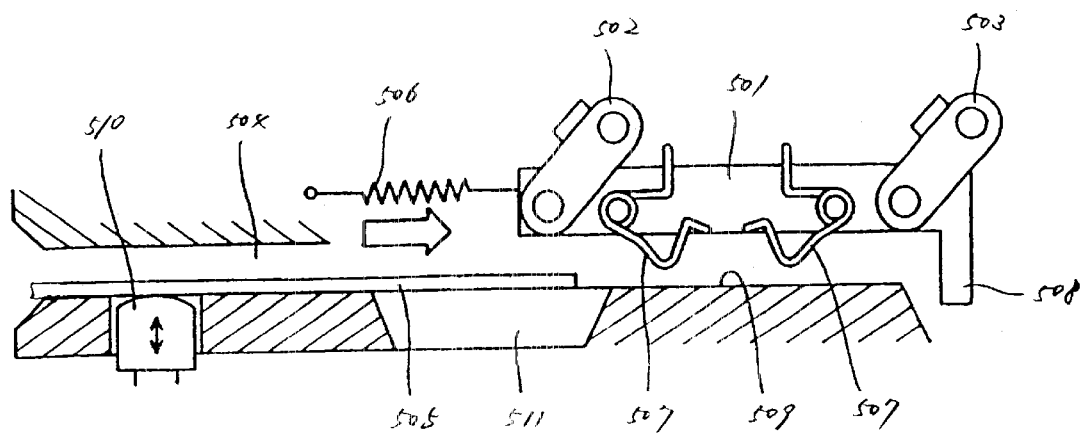
FIG. 15 illustrates an IC contacts block of a conventional manual IC card reader, which is in a condition before the IC card is inserted.
Figure 16:
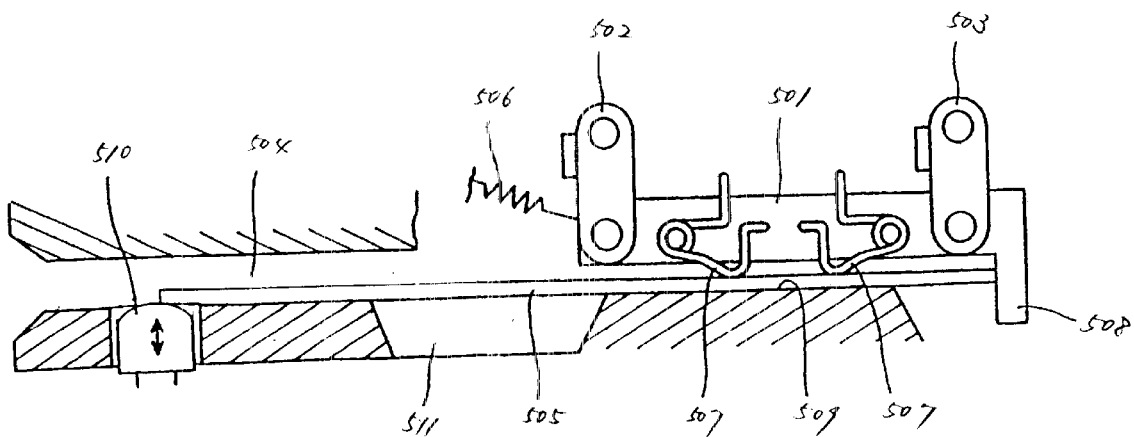
FIG. 16 illustrates the IC contacts block of the conventional manual IC card reader, which is in a condition when the IC card is inserted to the card stop position.

According to the IC card reader of the present invention, the front contacts 208b and rear contacts 208a arranged in the card insertion direction C make contact with the contact terminal pattern on the IC card 202 in a delayed manner, not simultaneously, as the card 202 comes in. Therefore, an abrupt increase of the card insertion load due to the contact between the IC contacts block 201 and IC card 202 can be prevented. FIG. 14 shows an example of the relationship between a moving distance, X, of the IC card 202 from the card insertion slot and a card insertion load, F. The portion shown by G1 in the figure indicates the condition of the load before the IC card 202 makes contact with the IC contacts block 201. The card insertion load at this time is caused by a friction with the card pathway or a pad pressure of the magnetic head (the pressure of the magnetic head to press the pad) when the device is a card reader commonly used for IC cards 202 and magnetic cards; the value thereof is very small compared to the values after the IC card makes contact with the IC contacts block 201 and is mostly constant regardless of the moving distance of the IC card 202. A point, A, in the figure indicates the starting point of the contact between the IC card 202 and IC contacts block 201. The portion shown by G2 in the figure is obtained in a conventional IC card reader in which the rear contacts and front contacts on the IC contacts block 201 arranged in the card insertion direction make contact with the IC card at the same time. Since a plurality of contacts on both rear and front sides start pressing the IC card all at once, the card insertion load abruptly increases after the point, A. On the other hand, the portion shown by G3 in the figure is obtained in the IC card reader of the present invention. In the present invention, the front contacts 208b and rear contacts 208a arranged in the card insertion direction press the IC card 202 in a delayed manner, not simultaneously; therefore, the increase of the card insertion load, F, with respect to the moving distance, X, of the IC card 202 is relatively moderate. In other words, the card insertion load is prevented from an abrupt increase, but increases moderately. Accordingly, the probability of error in magnetic data reading is decreased. Furthermore, the user of the IC card reader will not misunderstand the increase of the insertion load as the completion of the insertion, thus improving reliability of the communication with the IC card 202.

Note that the above embodiment is an example of preferred embodiments, but it is not limited to this. The embodiment can be variously modified within the scope of the present invention.

For example, the above embodiment uses the link mechanism for the attaching/detaching mechanism 233 to move the IC contacts block 201 into contact with or away from the contact terminal pattern on the IC card 202, but the mechanism is not limited to this. For instance, a cam mechanism may be used for the attaching/detaching mechanism 233 to cause a lag in the card contact starting time between the rear contacts 208a and front contacts 208b on the IC contacts block 201 in the card insertion direction, C, to contact the terminal pattern on the IC card 202. In the same manner as the above embodiment, the front contacts 208b and rear contacts 208a in the card insertion direction, C, press the IC card 202 in a delayed manner, not simultaneously; therefore, the probability of error in magnetic data reading can be decreased. Furthermore, the user of the IC card reader will not misunderstand the increase of the insertion load as the completion of the insertion, thus improving reliability of the communication with the IC card 202.

Also, in the above embodiment, the attaching/detaching mechanism 233 is configured such that the rear contacts 208a in the card insertion direction, C, contacts the IC card 202 first, and then the front contacts 208b in the card insertion direction, C, contacts the IC card 202. But the embodiment is not limited to this. According to the situation, the front contacts 208b in the card insertion direction, C, may contact the IC card 202 first, and then the rear contacts 208a may contact the IC card 202.

As understood from the above description, in the IC card reader described, the attaching/detaching mechanism is configured to cause a lag in the card contact starting time between the rear contacts and the front contacts on the IC contacts block arranged in the card insertion direction to contact the contact terminal pattern on the IC card. Therefore, the card insertion load can be prevented from increasing abruptly, but changes moderately. Consequently, the probability of error in magnetic data reading is decreased. Furthermore, the user will not misunderstand the increase of the card insertion load as the completion of the insertion, thus improving reliability of communication with the IC card.

Moreover, a further arrangement of the IC card reader, the attaching/detaching mechanism is a link mechanism; by changing the lengths of the rear link and front link arranged in the card insertion direction, a lag is caused in the card contact starting time between the rear contacts and the front contacts arranged in the card insertion direction. Therefore, the above useful effects can be obtained with a simple configuration and at low cost.

A further embodiment of the present invention is illustrated FIG. 17 through FIG. 20. A manual card reader 301 is provided a recess 304 at a frame 302 constructing a card insertion slot 303 in the card insertion direction shown by an arrow, a, in the figure for card insertion/removal, and is configured to move a card 305 from the card insertion slot 303 via the recess 304 to a card stop position 306, and then let the card 305 be removed.

The recess 304 is a portion of the frame 302 indented in the card insertion direction so that the card 305 can be inserted/removed while held by hand. A guide portion 322 is formed on both sides of the recess 304 for guiding the card to be inserted. The shape of the recess 304 is not limited to the one shown in this embodiment, but can be of any shape as long as the insertion/removal of the card 305 is possible or easy. Also, the card insertion slot 303 in this specification is a bottom surface (deeper side) of the recess 304 in a card pathway 314.

The card 305, a subject of the manual card reader 301 in this embodiment for data reading, is an IC card having a magnetic strip. Note that the card 305 is not limited to this, but can be a card having only the magnetic strip or IC.

In this embodiment, the manual card reader 301 comprises a card discharge opening 307 for discharging the card 305 in stop at the card stop position 306 to the back in the card insertion direction, a transporting means 308 for transporting the card 305 from the card stop position 306 to further back, a drive means 309 for driving the transporting means 308, and a positioning means 310 for positioning the card 305 in the card stop position 306, so that the card 305 that does not return to the card insertion slot 303 or cannot be withdrawn by hand can be discharged from the card discharge opening 307.

Figure 20:
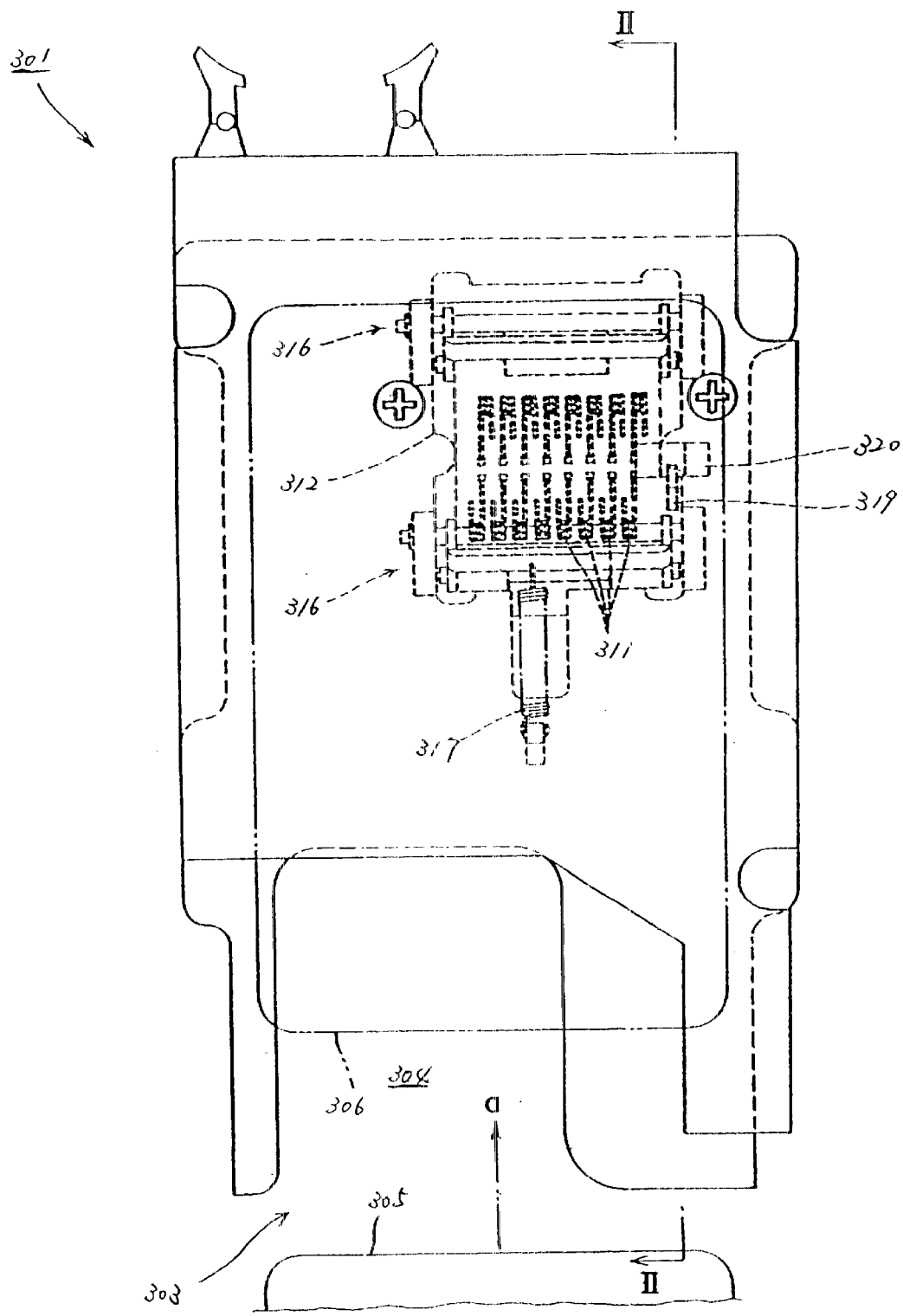
FIG. 20 is a simplified plan view of the IC card reader.
Figure 21:
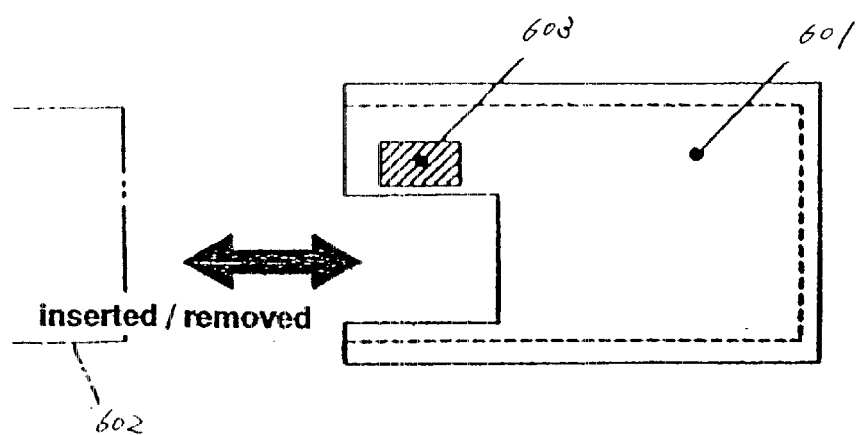
FIG. 21 is a conventional manual card reader.
Figure 22:
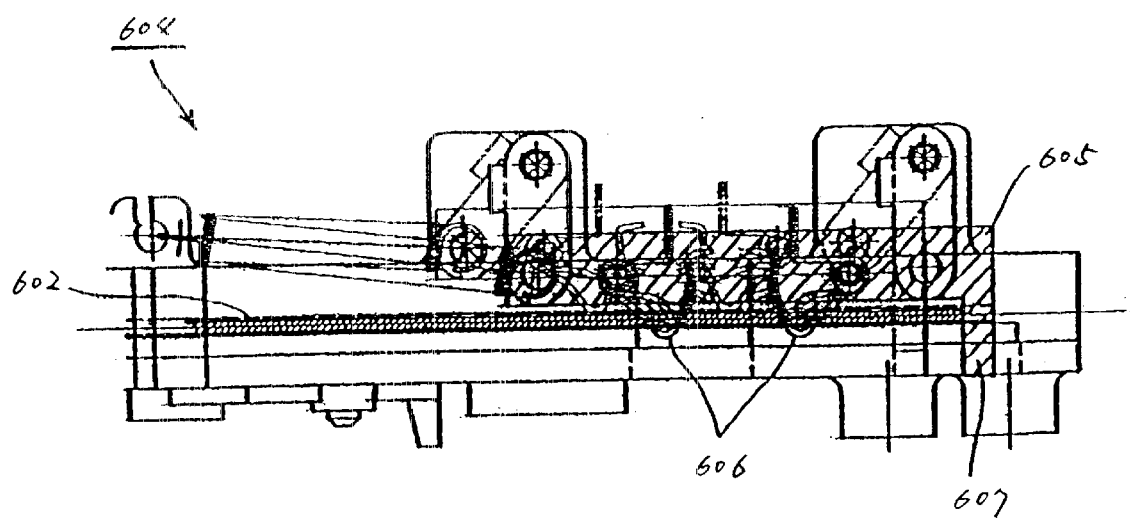
FIG. 22 is a conventional manual IC card reader.

The card stop position 306 is a predetermined position on the card pathway 314, at which the contacts 311 contacts a contact terminal pattern 305a on the card for data communication. The card 305 is positioned in stop at the location as illustrated in FIG. 20, for example, so that the contact terminal pattern 305a on the card faces the contacts 311.

The positioning means 310 is used for positioning the card 305 at the card stop position 306. The positioning means 310 is an optical sensor capable of sensing the side edge of the card 305 (the incoming edge of the card 305), for example. Upon sensing the card 305, the positioning means 310 stops the drive means 309 and transporting means 308 and then positions the card 305 at the predetermined stop position 306. Therefore, there is no need to provide a conventional stop that projects from the contacts block 312.

Figure 17:
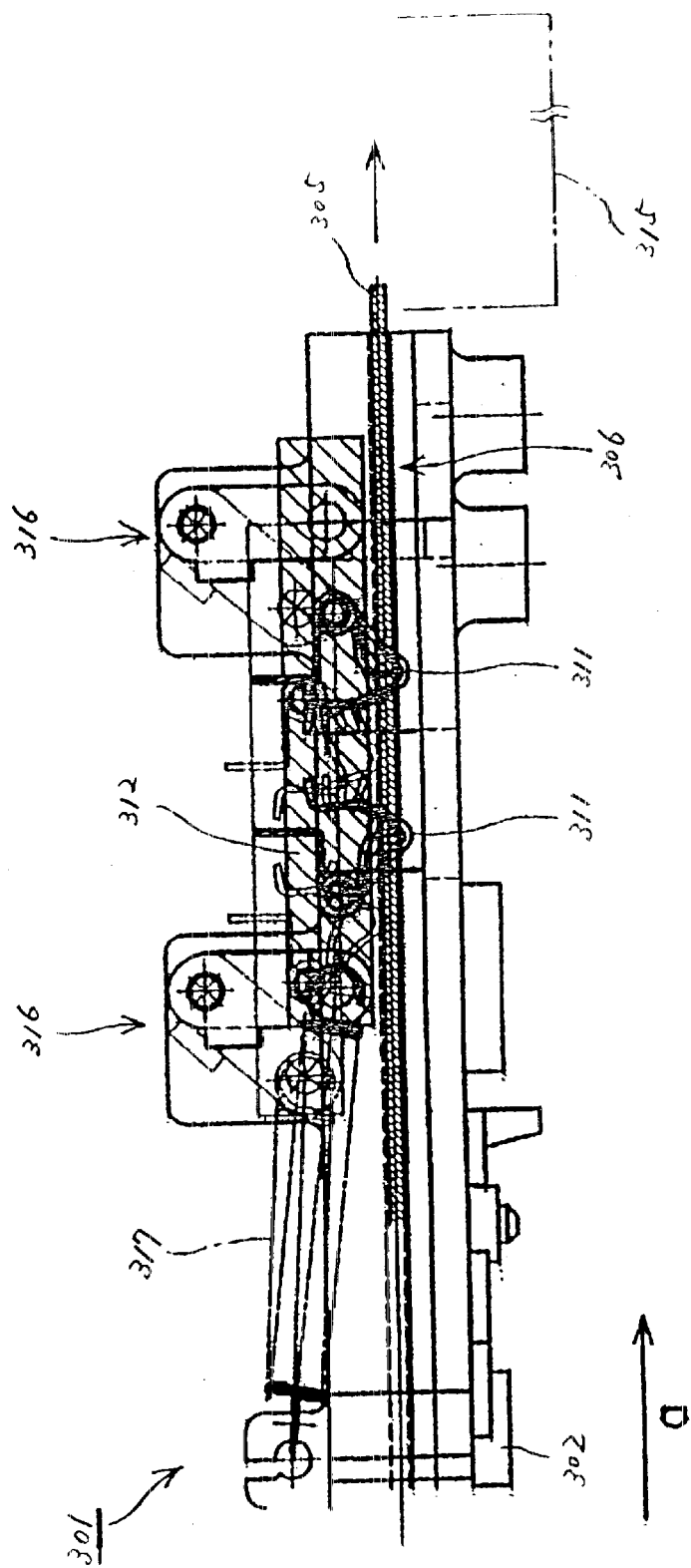
FIG. 17 is a vertical cross-sectional view of an IC card reader of an embodiment of the present invention, seen from the side.

The card discharge opening 307 is a transporting opening provided behind the card stop position 306 in the card insertion direction to make it possible to transport the card 305 from the card stop position 306 to further back. Behind the card discharge opening 307, a card receiving box 315 is provided as illustrated in FIG. 17 so that the card 305 discharged to the back can be temporarily held in the card reader 301.

The transporting means 308 and the drive means 309 for driving the transporting means 308 are the means for transporting the card 305 to the card stop position 306 and then from the card stop position 306 to further back. The transporting means 308 is, for example, a transport roller that contacts the surface of the card 305; the drive means 309 is a drive motor for rotating the transport roller. When a stepping motor is used for the drive motor, it is possible to control the card 305 stop position by counting the number of steps.

Figure 19:
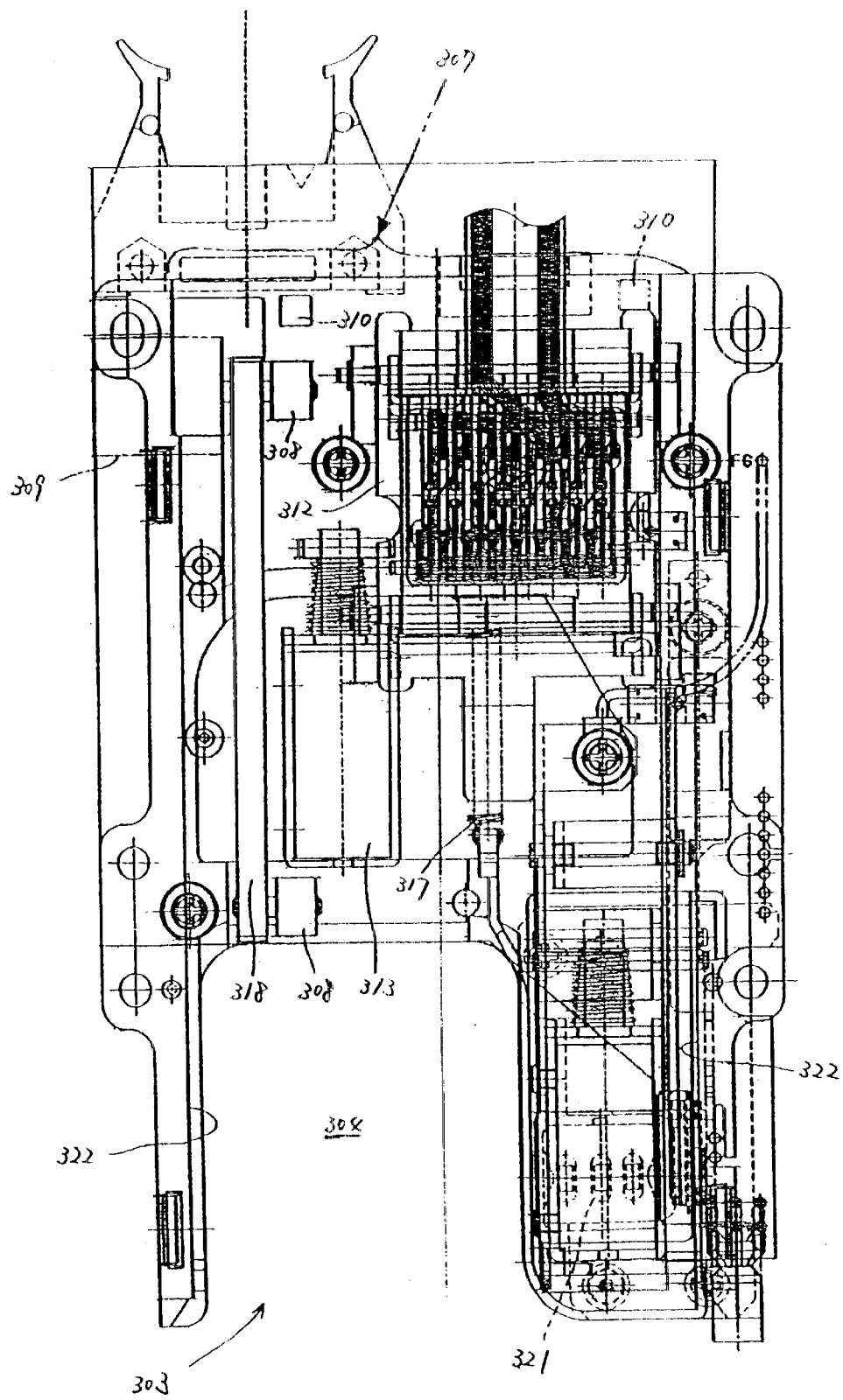
FIG. 19 is a plan view of the IC card reader.

Also, in this embodiment, the transport roller is provided at two locations in the card running direction, as illustrated in FIG. 19, such that they are synchronously rotated by a transport belt 318. In this case, the rear roller moves the card 305 from the card stop position 306 and discharges it to the back, and also the front roller supports the card 305 to move between the card insertion slot 303 and the card stop position 306.

Further, the manual card reader 301 of this embodiment has a contacts block 312 for IC card as a card data reading means and a magnetic head 321 for reading magnetic data on the card 305. The magnetic head 321 also functions as a detecting means for detecting the insertion of the card 305 by detecting magnetic data on the card 305. Although not specifically illustrated, a front sensor composed of an optical sensor can be used for detecting the insertion of the card 305.

The contacts block 312 is a member that moves the resilient contacts 311 into contact with or away from the contact terminal pattern 305a on the card 305. It moves (diagonal) to the card running direction, and brings the contacts 311 into resilient contact with the contact terminal pattern 305a at a contact position 312a for data communication. In this embodiment, the contacts block 312 is provided between two pieces of frames 302 and 302 of the manual card reader 301 so that it is moved in (diagonal) by a parallel link mechanism 316 as illustrated in FIG. 18 while kept in parallel to the card running pathway 314.

Figure 18:
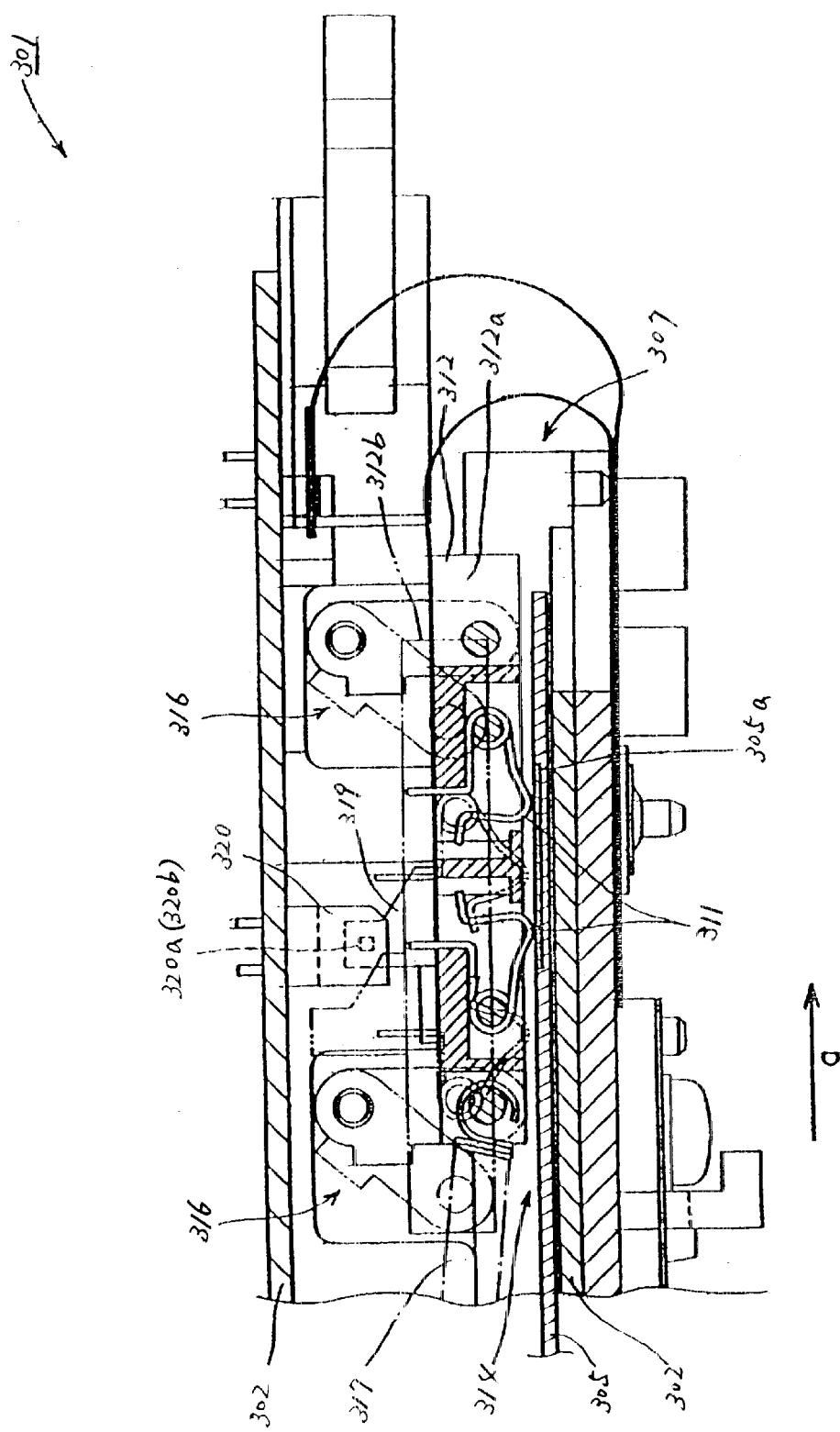
FIG. 18 is a vertical cross-sectional view of the IC card reader by II—II line in FIG. 20.

The parallel link mechanism 316 has two identical links as illustrated in FIG. 18, which are swung to move the contacts block 312 in parallel to the pathway. At this time, the contacts block 312 changes the distance from the card running pathway 314 while moving in parallel to the pathway, to move the contacts 311 into contact with or away from the contact terminal pattern 305a on the card 305. In this embodiment, the contacts block 312 is moved between the contact position 312a and a non-contact position 312b by a moving member 313. The moving member 313 is a solenoid, for example. Further, as illustrated in FIGS. 18 and 19, the contacts block 312 may be pushed by a force means 317 in the card removing direction (the direction opposite the card insertion direction, a).

The contacts 311 are configured such that a steel wire is wound inside the contacts block 312; by maintaining one end open, the contacts 311 are given resilience; the curved portions of the wire are projected from a side surface of the contacts block 312 to make contact with the contact terminal pattern 305a on the card 305. With this, the contacts 311 make resilient contacts with the terminal pattern 305a in a pushing manner, thus maintaining a good contact condition.

Moreover, provided in this embodiment are a moving portion 319 projecting upward from the contacts block 312 and a detecting means 320 for sensing that the moving portion 319 passes through, so that the position of the contacts block 312 can automatically be detected. The detecting means 320 is, for example, a photo interrupter having an emitting portion 320a and a photo receiving portion 320b. The moving portion 319 is a sheet-like shielding member that is capable of entering between the emitting portion 320a and photo receiving portion 320b.

The operation of the manual card reader 301 configured as above is described.

First, the card 305 is inserted through the card insertion slot 303; the drive means 309 is driven as the magnetic head 321 detects the magnetic data on the card 305 or the front sensor moves upon the card insertion. When the card 305 moves on the card pathway 314, the magnetic data recorded in the magnetic strip is also read.

Note that the manual card reader 301 may be configured such that a host controller (not illustrated) gives commands during the card transportation, and by calculating the driving speed of the drive means 309, the position of the card 305 may be controlled in the vicinity of the card stop position 306, with the hand of the user completely removed from the IC card. At this time, even if the card 305 moves further than the predetermined position, the transporting means 308 is used to stop the card 305 at the card stop position 306. In the manual card reader 301, it is possible to continue the operation supposing that the position the card 305 has stopped at is the card stop position 306.

Note that, in the manual card reader 301 of this embodiment, the inner wall on both sides of the card pathway 314 is formed as a guide for card transportation. Therefore, as illustrated in FIG. 17, the card 305 can be transported with no problems even by the transporting means 308 in the position which is shifted from the center of the card 305.

Next, the output signal of the positioning means 310 stops the drive means 309 and transporting means 308 to stop the card 305. After the card stops, the moving means 313 is moved to lower the contacts block 312 so that the contacts 311 are brought into resilient contact with the contact terminal pattern 305a on the card 305 for data communication. When the communication is successfully completed, the moving means 313 is returned to the original position, the contacts block 312 is moved away from the card 305, and the drive means 309 is driven in reverse to transport the card 305 back to the card insertion slot 303.

If a poor communication is detected or an invalid card 305 is detected, the drive means 309 is rotated in the right direction to discharge the card 305 from the card discharge opening 307. Therefore, even if the card 305 is left behind in the manual card reader, the card 305 can be collected inside the device. Thus, the exploitation and deliberate misuses by others can be prevented.

Note that, although the above mentioned embodiment is a preferred example of the present invention, it is not limited to this. The embodiment can be variously modified within the scope of the present invention. For example, in this embodiment, the optical sensor is used as the positioning means 310; however, a positioning pin that contacts the side edge of the card 305 (the incoming edge of the card 305) may be used. At this time, the positioning pin is provided to move between the contact position, at which it contacts the card side edge to stop the card 305, and the receded position, to which it withdraws from the contact position. With this, the positioning pin will not prevent the discharging when the card 305 is transported to the back from the card stop position 306. Also, if a plurality of positioning pins are arranged in the card width direction, the card 305 can easily be positioned in parallel to the card pathway. The positioning means including such a positioning pin may be any as long as it does not hinder the card transportation.

As understood from the above description, according to the arrangement of the manual card reader, the invalid card that is not necessary to be returned to the card insertion slot can temporarily be collected inside the device. Therefore, there is no need to take the invalid card to customer service to renew the card.

Further, even if the card holder forgets to remove the card from the card reader, the card which is not withdrawn from the card insertion slot for a predetermined time after the data communication can be discharged to the back from the card stop position and collected inside the device. Therefore, others cannot exploit and misuse the card.

According to another aspect of the manual IC card reader, in the same manner as the manual card reader described above, the invalid IC card that is not necessary to be returned to the insertion slot can be temporarily collected inside the device, and the card which is not withdrawn from the card insertion slot for a predetermined time after the data communication can be discharged to the back from the card stop position and collected inside the device.

Moreover, according to the manual IC card reader, the card can be stopped at the predetermined card stop position by the positioning pin at the contact position. Furthermore, when the IC card is discharged to the back, the positioning pin moves to the receded position, thus not hindering the card transportation.

While the foregoing description and drawings represent the present invention, it will be obvious to those skilled in the art that various changes may be made therein without departing from the true spirit and cope of the present invention

What is claimed is:

1. An IC card reader comprising:
   an attaching and detaching mechanism that moves an IC contacts block into contact with or away from a contact terminal pattern on an IC card;

wherein said attaching and detaching mechanism brings said IC contacts block into contact in a diagonal motion relative to said contact terminal pattern on said IC card such that a lag is caused in the card contact starting time between rear contacts and front contacts on said IC contacts block arranged in the card insertion.

2. The IC card reader as set forth in claim 1 wherein said attaching and detaching mechanism is a link mechanism, in which the lengths of rear and front links arranged in the card insertion direction are changed so as to cause a time lag in the card contact starting time between said rear contacts and front contacts arranged in the card insertion direction.

3. The IC card reader according to claim 1, wherein the attaching and detaching mechanism is a link mechanism comprising:

a front link having one end rotatably attached to a first front shaft and another end rotatably attached to the contacts block through a second front shaft; and a rear link having one end rotatably attached to a first rear shaft and another end rotatably attached to the contacts block through a second rear shaft.

4. The IC card reader according to claim 1, wherein the attaching and detaching mechanism is a link mechanism comprising:

a front link having one end rotatably attached to a first front shaft and another end rotatably attached to the contacts block through a second front shaft; and a rear link having one end rotatably attached to a first rear shaft and another end rotatably attached to the contacts block through a second rear shaft;

wherein when the contacts block is positioned closest to the IC card, the front and rear links are positioned perpendicular to the IC card.

5. The IC card reader according to claim 1, wherein the attaching and detaching mechanism is a link mechanism comprising:

a front link having one end rotatably attached to a first front shaft and another end rotatably attached to the contacts block through a second front shaft; and a rear link having one end rotatably attached to a first rear shaft and another end rotatably attached to the contacts block through a second rear shaft;

wherein when the IC card is fully received, the IC contacts block contacts a stopper such that the second rear shaft is positioned deeper than the first rear shaft in relation to a card insertion slot.

* * * * *